United States Patent [19]

Hines

[11] Patent Number: 5,096,249

[45] Date of Patent: Mar. 17, 1992

[54] ANTI-THEFT VEHICLE CONTAINER

[76] Inventor: Troy Hines, 107 Shoreline, Richmond, Calif. 94804

[21] Appl. No.: 648,040

[22] Filed: Jan. 30, 1991

[51] Int. Cl.$^5$ ............................................. B60R 7/04
[52] U.S. Cl. ................................ 296/37.15; 224/275; 297/192
[58] Field of Search ........................ 296/37.15, 37.1; 224/275, 42.42; 297/192

[56] References Cited

U.S. PATENT DOCUMENTS 1,897,717  2/1933  Appel ........................ 296/37.15

FOREIGN PATENT DOCUMENTS 229613   7/1987  European Pat. Off. ......... 296/37.15
3503967  8/1986  Fed. Rep. of Germany ... 296/37.15

*Primary Examiner*—Robert R. Song
*Attorney, Agent, or Firm*—Bielen, Peterson & Lampe

[57] ABSTRACT

An anti-theft container for a vehicle utilizing an enclosure having a bottom portion and a side portion extending therefrom. The enclosure also possesses a top portion which may be hingedly attached to the bottom portion. The enclosure is slidably fastened beneath the seat of the vehicle and is formed with a bar connected to the enclosure to aid in the locking of the container beneath the seat of the vehicle. A lock is linked to the bar and engages a track which extends along one side of the enclosure.

8 Claims, 3 Drawing Sheets

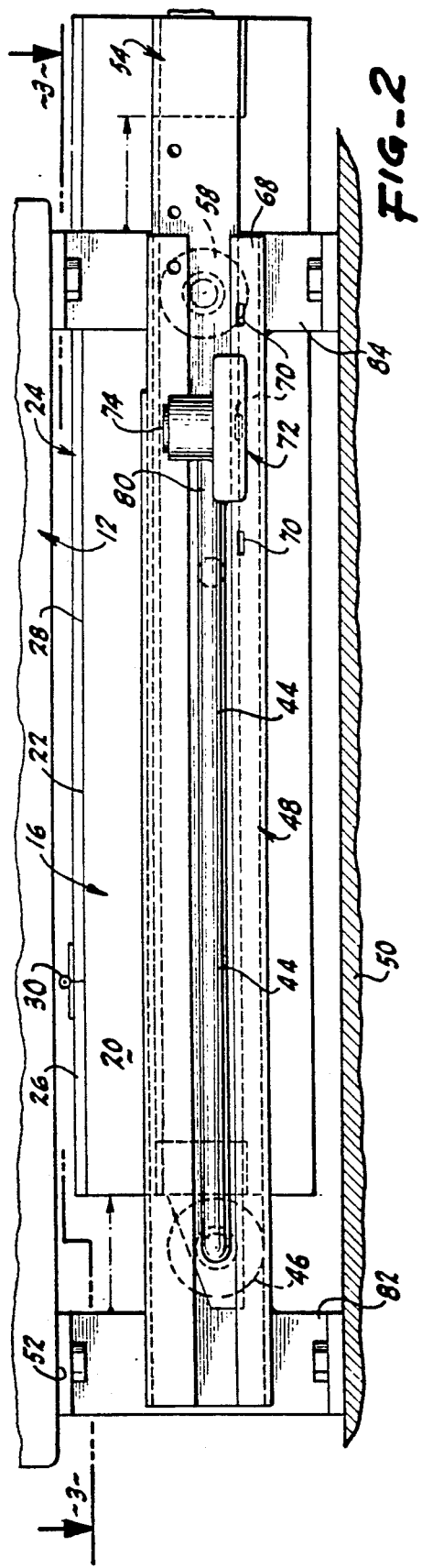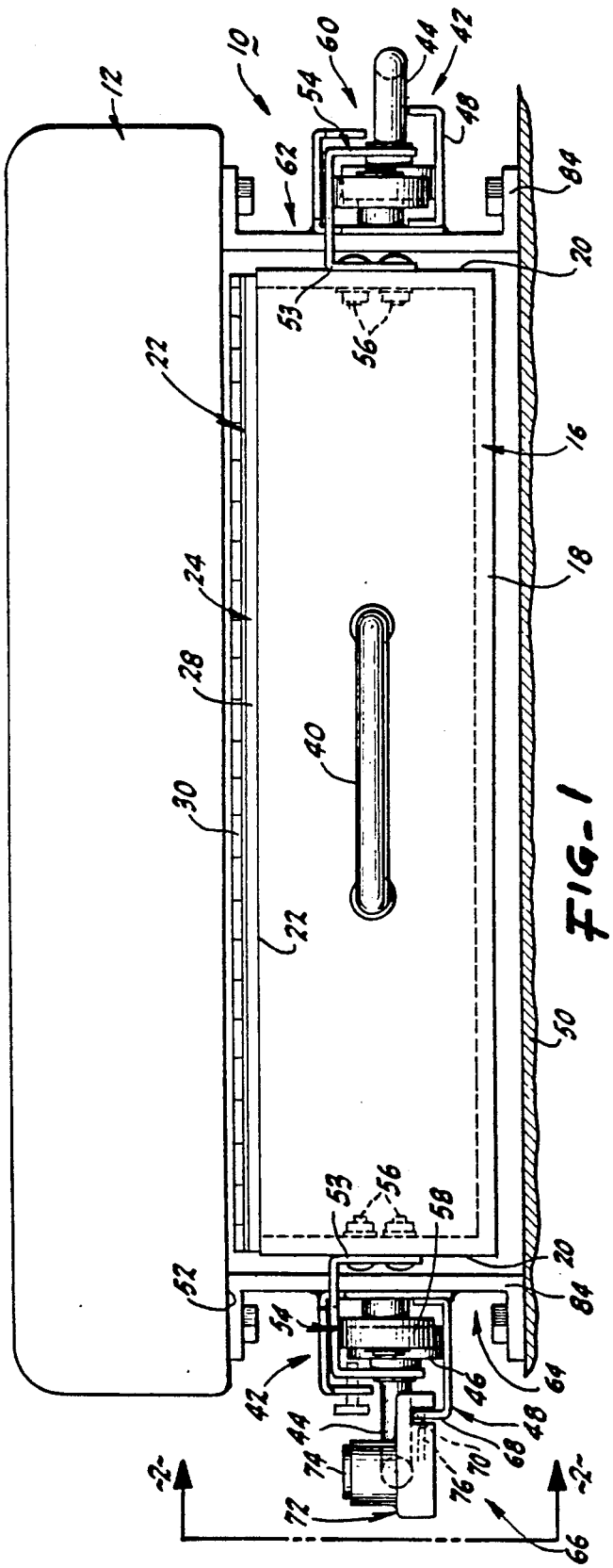

ANTI-THEFT VEHICLE CONTAINER

BACKGROUND OF THE INVENTION

The present invention relates to a novel and useful anti-theft container for a vehicle.

Contents of vehicles are notoriously vulnerable to theft. For example, such vehicle contents include cellular telephones, radios, and other video and audio playback devices, such as tape recorders, compact dics players and the like. These items are normally installed to be easily accessible within a vehicle since they are often designed to be removed for repair and maintenance.

To enhance the security of vehicle accessories, such items have been designed for complete removal by the vehicle operator. In the past, the user of the vehicle accessories often carried the same from the vehicle to a more secure place such as an edifice when the vehicle was not being driven. Unfortunately, such removal and replacement of valuable vehicle accessories is tedious, time consuming, inconvenient, and subjects the accessories to breakage.

Storage containers for vehicles, generally for the containment of liter, have been devised in the past, such as those found in U.S. Pat. Nos. 2,958,499, 3,802,863, and 3,625,347. Many of these storage containers are placed under vehicle seats but are easily removable, since such compartments are not intended to be secure against theft.

U.S. Pat. No. 4,878,706 discloses an anti-theft system which employs a container placed in the trunk of a vehicle. Unfortunately certain vehicles do not possess trunk space i.e. Station Wagons, Vans and the like. U.S. Pat. No. 3,026,141 shows a compartment which is placed under the seat of the vehicle and is locked by a conventional latch. Such underseat compartment is difficult to slide out from under the seat after unlocking.

An anti-theft vehicle container which is easily secured, is accessible in the vehicle, and is capable of supporting heavy vehicle accessories would be a notable advance in the vehicle industry.

SUMMARY OF THE INVENTION

In accordance with the present invention a novel and useful anti-theft vehicle container is herein provided.

The container of the present invention utilizes an enclosure which possesses a bottom portion and a side portion extending from the bottom. The enclosure also includes a top portion which serves as a cap for the side portion. The top portion may include a cover which is hingedly attached to the side portion to provide access to the enclosure. In addition, partitions may be placed within the enclosure to form subcompartments which serve as storage areas for various items which may be stored in the container, such as car phones, radios, tape decks, and the like. In addition, the enclosure is sized to fit underneath the vehicle seat.

Means is provided in the present invention for slidably fastening the enclosure beneath the seat of the vehicle such that the enclosure is movable out from and adjacent to the vehicle seat for access to the same. Such means may take the form of a track fastened to the vehicle floor. A bar is connected to the enclosure and is provided with a wheel which is movable on the track. In addition, the present invention may be provided with a second track connected to the bar and the enclosure. A second wheel is also provided and is connected to the first track such that the first and second wheels lie within the second track. In addition, the second track lies within the first track and is movable with the connected bar and enclosure. Thus, the second track is also slidable relative to the first track.

Means is also included in the present invention for locking the enclosure to a selected position beneath the seat of the vehicle. Such locking means may take the form of providing the first track with a multiplicity of slots and connecting a lock to the movable bar. The lock would include a retractable pin which selectively engages any of the slots provided along the first track. Of course, the bar would be accessible at the side of the vehicle adjacent one of the vehicle doors, in most cases.

It may be apparent that a novel and useful anti-theft container for a vehicle has been described.

It is therefore an object of the present invention to provide an anti-theft container for a vehicle which is easily locked yet remains accessible to store valuables within the vehicle.

Another object of the present invention to provide an anti-theft container for a vehicle which serves as a substitute for the security afforded by the trunk of a vehicle.

Another object of the present invention is to provide an anti-theft container for a vehicle is easily installed in new or old vehicles and is compatible with the seat adjusting systems commonly used in vehicles.

A further objective of the present invention is to provide an anti-theft container for a vehicle which requires a minimal effort to obtain access to the same under typical driving conditions.

The invention possesses other objects and advantages especially as concerns particular characteristics and features thereof which will become apparent as the specification continues.

BRIEF DESCRIPTION OF THE DRAWINGS

FIG. 1 is a front elevational view of the anti-theft security container of the present invention in place under a vehicle seat.

FIG. 2 is a left side elevational view of the anti-theft container of the present invention taken line 2—2 of FIG. 1.

For a better understanding of the invention reference is made to the following detailed description of the preferred embodiments thereof which should be referenced to the heretofore described drawings.

DESCRIPTION OF THE PREFERRED EMBODIMENTS

Various aspects of the present invention will evolve from the following detailed description of the preferred embodiments which should be taken in conjunction with the prior described drawings.

Figure 3:
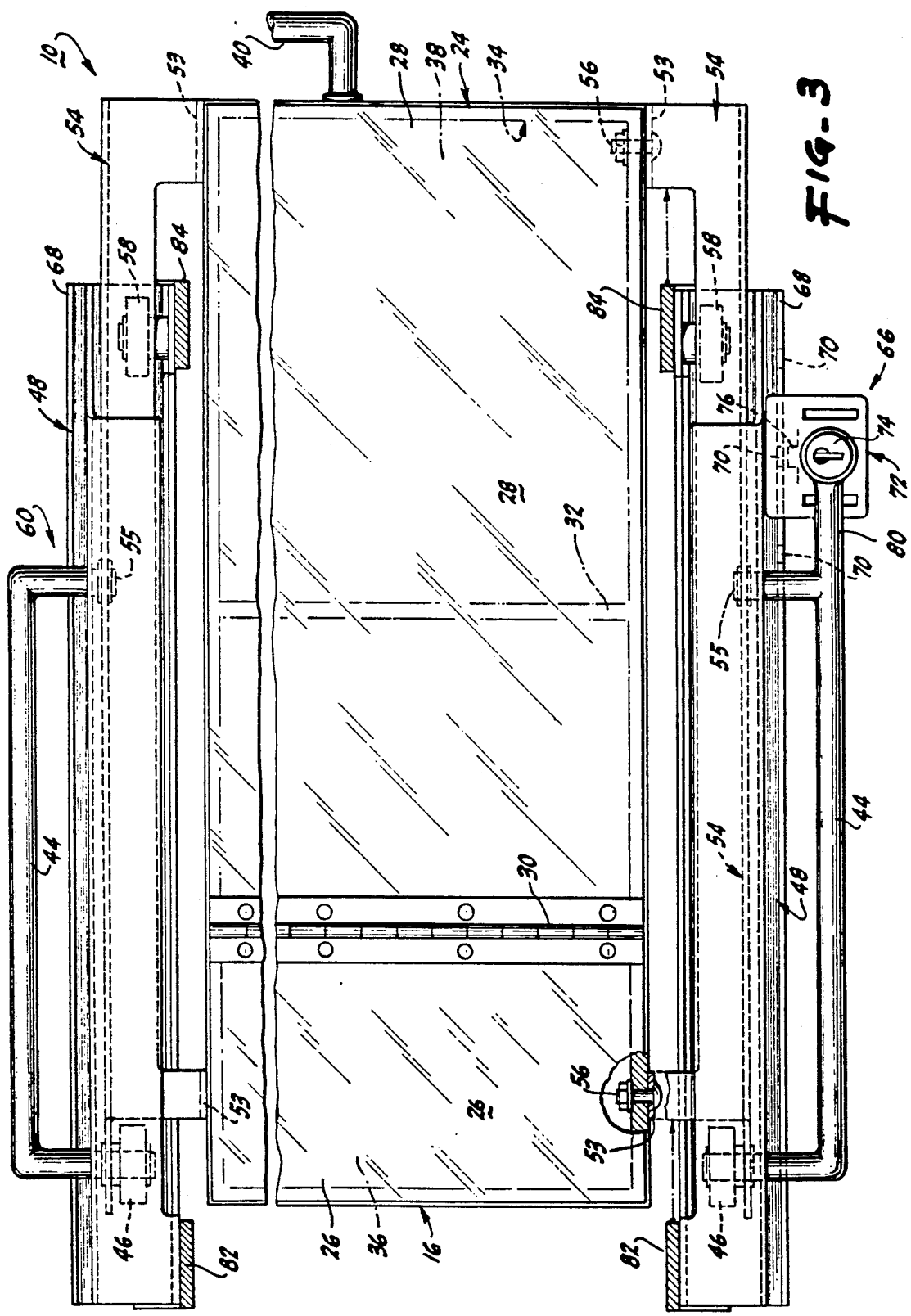
FIG. 3 is a sectional view taken along line 3—3 of FIG. 2.

The invention as a whole is depicted in the drawings by reference character 10. The anti-theft container 10 is usable with a vehicle seat 12, FIGS. 1–4, best shown in FIG. 4. Container 10 is intended for placement in the space 14 found beneath vehicle seat 12. Container 10 includes as one of its elements an enclosure 16 which possesses a bottom portion 18 and side portion 20 extending therefrom. Enclosure 16 also includes a top portion 22 formed with cover 24 constructed of transparent material, such as plastic, glass, and the like. Cover 24 is formed into two portions 26 and 28 which are hingedly connected to one another by piano hinge 30. Cover 24 lies atop side portion 20 of enclosure 16. Portion 26 may be fastened to side portion 20. Partition 32 divides the interior chamber 34 of enclosure 16 into spaces 36 and 38. Of course, a multiplicity of such partitions may be employed to form greater than two spaces within enclosure 16. As depicted in the drawings, spaces 36 and 38 are intended to hold valuable items such as car phones, stereos units, and the like, FIG. 3. A pull handle 40 is connected to side portion 20 of enclosure 16 to permit the user to manipulate enclosure 16 which will be described in greater detail hereafter. Cover 24 may be latched to enclosure 16 (not shown) by the use of a conventional lock.

Means 42 is included in the present invention for slidingly fastening enclosure 16 beneath seat 12. With reference to FIGS. 1 and 2, means 42 is illustrated on the left side 64 of enclosure 16 in the form of a bar 44 having a wheel 46 which rides along a first track 48. First track 48 is fastened to floor 50 of the vehicle and to the bottom portion 52 of vehicle seat 12 by the use of plurality of brackets 82 and 84. In addition, bar 44 connects to a U-shaped second track 54 at arm 55 is itself fastened to side 20 of enclosure 16 by the use of fasteners 56 and directly at leg 53 of track 54. Thus, bar 44, second track 54, wheel 46 and enclosure 16 move as a unit. A second stationary rotating wheel 58 connects to enclosure 16 via bracket 84 to aid in the movement of bar 44, enclosure 16 and second track 54 which itself travels relative to first track 48. A similar bar and track unit 60 is found on the right side 62 of enclosure 16.

The present invention also possesses means 66 for locking container 10 to a selected position beneath seat 12. Again, with reference to FIGS. 1 and 2, it may be observed that track 48 is constructed with a flange 68 having a plurality of openings 70, FIGS. 1 and 3, along the length of the same. Lock 72 is of conventional configuration, FIG. 3. Lock 72 includes a key operated cylinder 74 which moves a lug 76 inwardly and outwardly from lock body 78. Lock body is welded to end portion 80 of bar 44. It should be apparent, that lug 76 selectively engages one of the plurality of slots or openings 70 along flange 68 of first track 48. In this regard, lock 72 is depicted as being in the engaged position in FIGS. 1 and 3.

Figure 4:
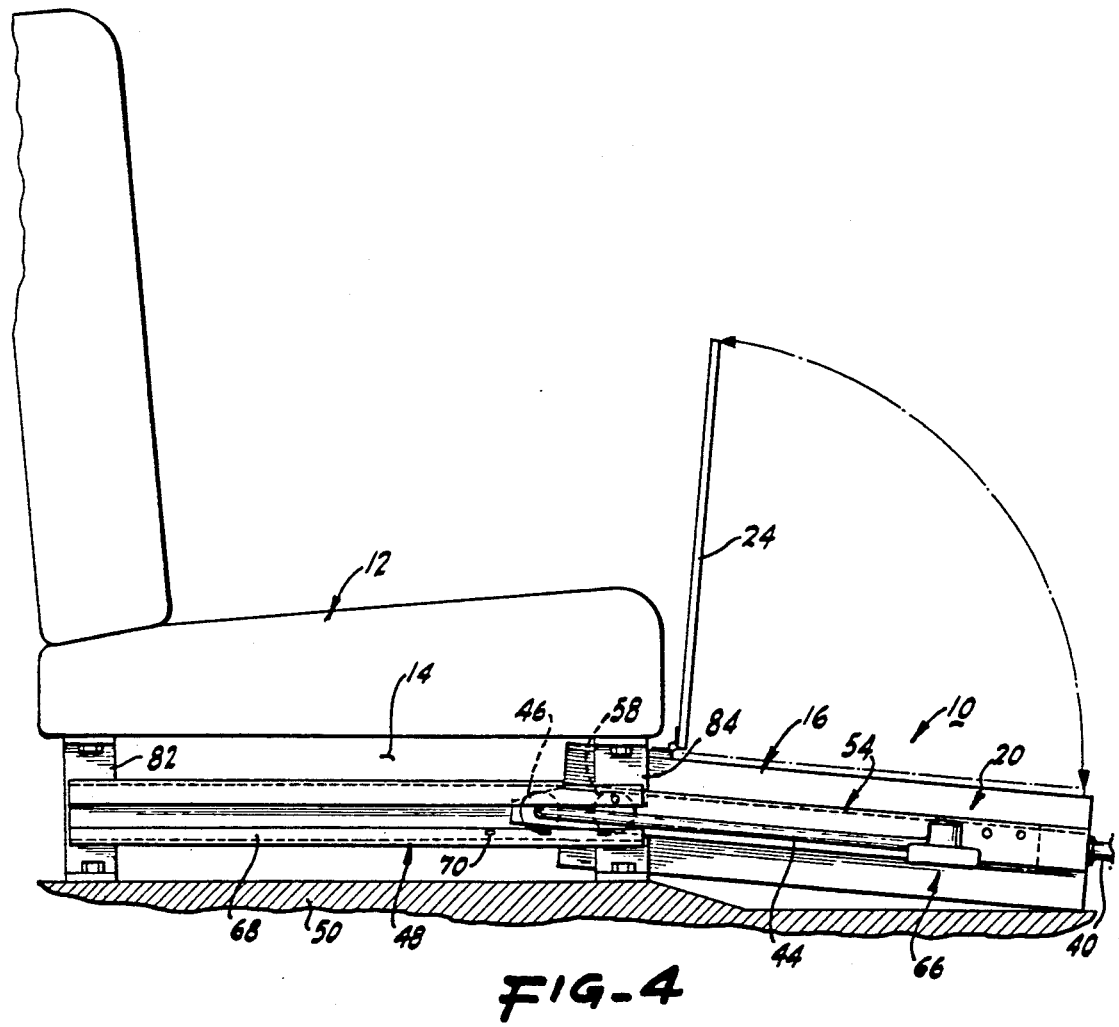
FIG. 4 is a side elevational view of the anti-theft container of the present invention in place under a vehicle seat and depicting the removal of the same from underneath the vehicle seat.

In operation, the user fastens container 10 through the floor 50 of the vehicle by the use of fasteners 56. To permit easy access, bar 44 and lock 72 would be positioned outboard and adjacent the door to the vehicle. In this regard, access to enclosure 16 is readily available. With reference to FIG. 4 it may be apparent that lock 72 releases container 10 from a position within space 14 beneath vehicle seat 12. Sliding means 42 is then activated in which track 54 slides relative to wheel 58 within track 48. It should be noted that track 54 is U-shaped so as not to interfere with bracket 84 when track 54 and connected enclosure 16 slide in and out relative to seat 12. Handle 40 is employed to extend container 10 to the position shown in the righthand side of FIG. 4 where cover 24 may be lifted to gain access to interior 34 of enclosure 16. Enclosure 16 may be again forced back underneath seat 12 and secured by locking means 66.

While in the foregoing embodiments of the invention have been set forth in considerable detail for purposes of making a complete disclosure of the invention it may be apparent to those of skill in the art that numerous changes may be made in such details without departing from the spirit and principals of the invention.

What is claimed is:

1. An anti-theft container for a vehicle having seats elevated from the floor of the vehicle, comprising:
   a. an enclosure, said enclosure having a bottom portion and side portion extending therefrom, said enclosure also having a top portion;
   b. means for slidably fastening said enclosure beneath a seat of the vehicle; and
   c. means for locking said container to a selected position beneath the seat, said locking means including a bar connected to said enclosure, a lock linked to said bar and one track extending along said enclosure, said one track having a multiplicity of slots engagable by said lock.

2. The security container of claim 2 in which said means for slidably fastening said enclosure beneath a seat of the vehicle includes said one track being fastened to the vehicle, one what connected to said bar and being movable on said one track.

3. The security container of claim 2 in which said means for slidingly fastening said enclosure beneath a seat of the vehicle further includes another track connected to said bar and said enclosure, and another wheel connected to said one track, said one and another wheels lying within said another track said another track lying within said one track and being movable thereto with said bar and said enclosure.

4. The security container of claim 1 in which said means for slidingly fastening said enclosure beneath a seat includes means for sliding said enclosure outwardly from beneath, and adjacent to the vehicle seat.

5. The security container of claim 1 which said top portion additionally comprises a cover movably connected to said top side of said enclosure.

6. The security container of claim 5 which additionally comprises means for locking said cover to said enclosure.

7. The security container of claim 6 in which said cover includes a transparent portion.

8. The security container of claim 1 in which said enclosure further comprises a partition forming compartments within said container.

* * * * *